W. FIELDS & D. KERBAUGH.
Apparatus for Loading and Unloading Vessels, &c.
No. 207,803. Patented Sept. 10, 1878.
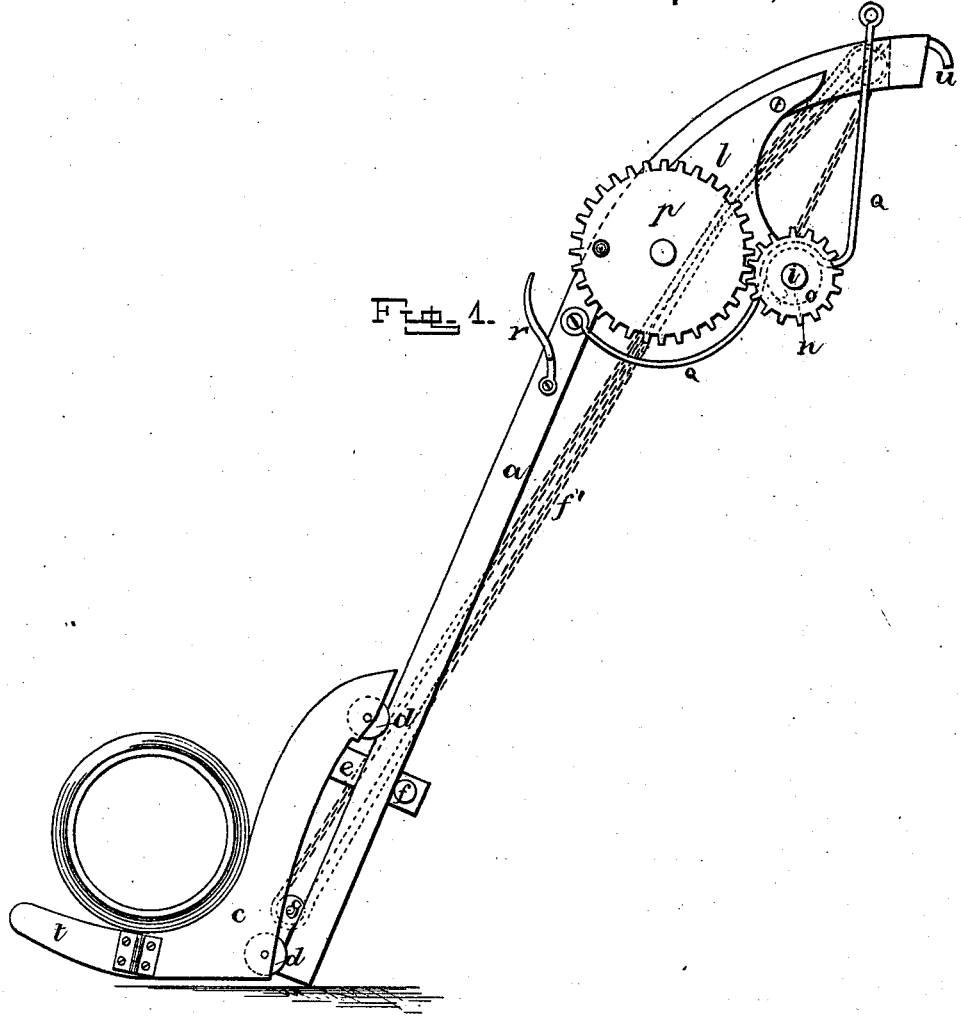
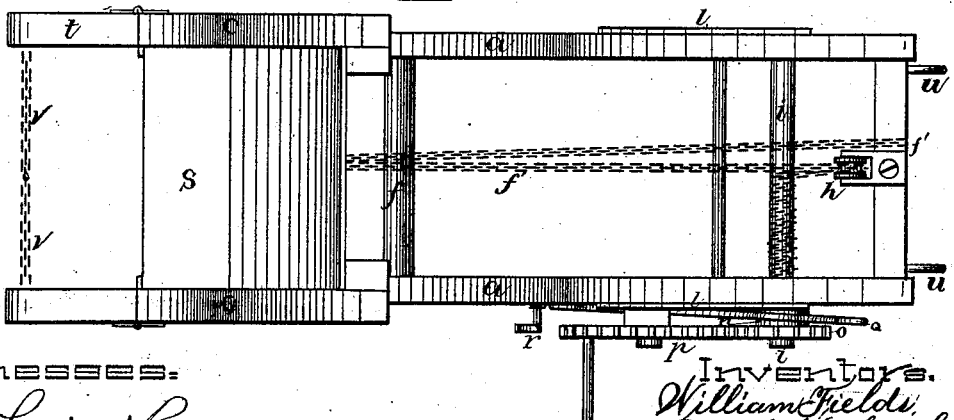

UNITED STATES PATENT OFFICE.

WILLIAM FIELDS AND DANIEL KERBAUGH, OF WILMINGTON, DELAWARE.

IMPROVEMENT IN APPARATUS FOR LOADING AND UNLOADING VESSELS, &c.

Specification forming part of Letters Patent No. 207,803, dated September 10, 1878; application filed August 15, 1878.

*To all whom it may concern:*

Be it known that we, WILLIAM FIELDS and DANIEL KERBAUGH, of Wilmington, in the county of New Castle and State of Delaware, have invented certain new and useful Improvements in Devices for Loading and Unloading Vessels, &c.; and we do hereby declare the following to be a full, clear, and exact description of the invention, such as will enable others skilled in the art to which it pertains to make and use it, reference being had to the accompanying drawings, which form part of this specification.

Our invention relates to an improvement in devices for raising and lowering weights from vessels, cellars, wagons, &c.; and it consists in a skid, a carriage provided with suitable rollers or wheels, a chain, and a suitable operating mechanism, whereby barrels, boxes, and heavy weights of all kinds can be raised and lowered with ease and safety, as will be more fully described hereinafter.

The accompanying drawings represent our invention.

$a$ represents a skid or frame of any suitable construction, which has its upper end curved backward, as shown. Moving back and forth upon this frame is the carriage $c$, either of the form here shown or any other that may be preferred, and which is provided with a flanged wheel or roller, $d$, at each corner, the flanges of the wheels being made to catch over both edges of the sides of the frame, so as to prevent the slightest lateral motion of the carriage.

Projecting downward from the under side of the carriage, below the lower edges of the frame $a$, are the two bearings $e$, in which is journaled the roller $f$, which bears against the under side of the frame, so as to prevent the carriage from becoming separated from the frame under any circumstances.

Fastened to the upper end of the frame is one end of the rope or chain $f'$, which passes down around the pulley or roller $g$ on the lower end of the carriage, back over the roller $h$ on the upper end of the frame, and then down around the shaft $i$, journaled in the supports $l$, secured to the sides of the frame $a$.

Upon one of the ends of this shaft $i$ is secured the friction-drum $n$, and outside of this drum is the pinion $o$, which meshes with the wheel $p$, to which is secured the operating lever or handle.

Pivoted to the side of the frame $a$ is the long curved lever $q$, which bears upon the drum $n$, so that by frictional contact the descent of the carriage can be regulated at will. When it is desired to hold the carriage suspended at any point, the dog $r$ will be made to engage with the teeth of the wheel $p$, and thus prevent it from turning backward.

The lower end of the carriage $c$ is provided with a shelf, $s$, to receive square boxes or articles, or articles that are too short to reach from one side of the carriage to the other, and upon each corner is formed a long curved horn, $t$, to support barrels and casks. As the horns have to be of considerable length to securely hold round bodies of all kinds, they stick out to such a distance that it would require a very great effort to raise a heavy body up over them, and then the body would have too great a distance to fall down into the hollow back of them. In order to avoid this difficulty, both horns are hinged to the lower corners of the carriage, so that they can be folded back entirely out of the way, both for loading and unloading the articles on the carriage. In loading, after the hogshead, barrel, or other other object has been raised upon the end of the carriage, the two horns may be moved back into position so as to catch against its under side, and then held in that position by the two short chains $v$, which meet half-way between them.

To the upper end of the frame are secured the hooks $u$, for attaching that end to any suitable supports.

Instead of the single pulleys or rollers for the chain to pass over, there may be two sets, if so preferred; and instead of the two operating-wheels, as shown, there may be an additional small gear used when great power is required.

Having thus described our invention, we claim—

1. The combination of the frame $a$, carriage $c$, having the wheels or rollers $d$ and $f$, the rope or chain $f'$, rollers $g$ $h$, shaft $i$, and operating wheels or gears, substantially as described.

2. The carriage $c$, having the horns $t$, hinged thereto so as to be closed back out of the way, substantially as specified.

In testimony that we claim the foregoing we have hereunto set our hands this 6th day of August, 1878.

WILLIAM FIELDS.
DANIEL KERBAUGH.

Witnesses:
   JNO. HENRY PUHL,
   THOMAS ZORFE.